(12) United States Patent
Xue et al.

(10) Patent No.: US 10,187,111 B2
(45) Date of Patent: Jan. 22, 2019

(54) METHOD AND APPARATUS FOR COMMUNICATION IN CELLULAR IOT NETWORK

(71) Applicant: Samsung Electronics Co., Ltd, Gyeonggi-do (KR)

(72) Inventors: Peng Xue, Suwon-si (KR); Nam-Jeong Lee, Suwon-si (KR); Cheol Jeong, Seongnam-si (KR); Hyun-Seok Ryu, Yongin-si (KR); Sung Ho Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/504,309

(22) PCT Filed: May 18, 2016

(86) PCT No.: PCT/KR2016/005280
§ 371 (c)(1),
(2) Date: Feb. 15, 2017

(87) PCT Pub. No.: WO2016/186456
PCT Pub. Date: Nov. 24, 2016

(65) Prior Publication Data
US 2018/0115344 A1 Apr. 26, 2018

Related U.S. Application Data

(60) Provisional application No. 62/163,036, filed on May 18, 2015.

(51) Int. Cl.
*H04B 1/7143* (2011.01)
*H04B 1/713* (2011.01)
(Continued)

(52) U.S. Cl.
CPC ............ *H04B 1/713* (2013.01); *H04L 5/0012* (2013.01); *H04L 5/0062* (2013.01); *H04L 29/08* (2013.01);
(Continued)

(58) Field of Classification Search
CPC ............................ H04B 1/7136; H04B 1/7143
(Continued)

(56) References Cited

U.S. PATENT DOCUMENTS

2008/0298434 A1    12/2008  Nyberg et al.
2010/0158078 A1*    6/2010  Ro ...................... H04B 1/7143
                                                        375/135
(Continued)

FOREIGN PATENT DOCUMENTS

KR    10-2009-0033802 A    4/2009
KR    10-2013-0119867 A    11/2013
KR    10-2014-0055855 A    5/2014

OTHER PUBLICATIONS

LG Electronics, "Discussion on frequency hopping and subband for Rel-13 MTC UEs," R1-151486, 3GPP TSG RAN WG1 Meeting #80bis, Belgrade, Serbia, Apr. 20-24, 2015, 7 pages.
(Continued)

*Primary Examiner* — Kevin Kim

(57) ABSTRACT

The present disclosure relates to a communication scheme and system which fuse a 5G communication system for supporting a higher data transfer rate than a 4G system with IoT technology, and a system thereof. The present disclosure may be applied to smart services such as smart homes, smart buildings, smart cities, smart cars or connected cars, healthcare, digital education, retail businesses, security and safety services, etc., based on 5G communication technologies and IoT related technologies. The communication method with a device according to the present invention comprises the
(Continued)

steps of: transmitting information on frequency hopping settings to the device; and receiving, from the device, an uplink signal which hops frequencies according to the frequency hopping settings, wherein the frequency hopping settings are configured in a way that the uplink signal hops frequencies according to hopping patterns which hop according to frequency hopping steps, and to additional mirroring hopping patterns which are respectively inserted between the hopping patterns.

6 Claims, 13 Drawing Sheets

(51) Int. Cl.
    *H04L 29/08*     (2006.01)
    *H04W 4/70*     (2018.01)
    *H04L 5/00*     (2006.01)
    *H04W 84/04*     (2009.01)
    *H04W 88/08*     (2009.01)

(52) U.S. Cl.
    CPC ............... *H04W 4/70* (2018.02); *H04L 67/12* (2013.01); *H04W 84/042* (2013.01); *H04W 88/08* (2013.01)

(58) Field of Classification Search
    USPC .......................................................... 375/132
    See application file for complete search history.

(56) References Cited

U.S. PATENT DOCUMENTS

| | | | |
|---|---|---|---|
| 2010/0189032 A1* | 7/2010 | Chen | H04B 1/7143 370/328 |
| 2010/0284363 A1* | 11/2010 | Ahn | H04B 1/7143 370/330 |
| 2012/0002616 A1 | 1/2012 | Ishii et al. | |
| 2013/0029439 A1 | 1/2013 | Song et al. | |
| 2015/0092710 A1 | 4/2015 | Novlan et al. | |
| 2016/0020822 A1* | 1/2016 | Li | H04B 1/715 375/133 |

OTHER PUBLICATIONS

NEC, "Details of the UL frequency hopping scheme for LTE Rel-13 MTC," R1-151557, 3GPP TSG RAN WG1 Meeting #80bis, Belgrade, Serbia, Apr. 20-24, 2015, 4 pages.

Communication from a foreign patent office in a counterpart foreign application, European Patent Office, "Supplementary Partial European Search Report," Application No. EP 16796783.5, dated May 24, 2018, 7 pages.

LG Electronics, "Proposal for PUSCH hopping," R1-074741, 3GPP TSG RAN WG1 #51, Jeju, Korea, Nov. 5-9, 2007, 4 pages.

Samsung, "UL LFDMA with hopping in PUSCH," Tdoc R1-073537, 3GPP RAN WG1 Meeting #50, Athens, Greece, Aug. 20-24, 2007, 3 pages.

Samsung, et al., "Frequency Hopping Pattern for PUSCH," R1-080038, 3GPP TSG RAN WG1 Meeting #51bis, Sevilla, Spain, Jan. 14-18, 2008, 3 pages.

\* cited by examiner

METHOD AND APPARATUS FOR COMMUNICATION IN CELLULAR IOT NETWORK

CROSS-REFERENCE TO RELATED APPLICATIONS AND CLAIM OF PRIORITY

The present application claims priority under 35 U.S.C. § 365 to International Patent Application No. PCT/KR2016/005280 filed May 18, 2016, entitled "METHOD AND APPARATUS FOR COMMUNICATION IN CELLULAR TOT NETWORK", and, through U.S. Provisional Patent Application No. 62/163,036 filed May 18, 2015, each of which are incorporated herein by reference into the present disclosure as if fully set forth herein.

TECHNICAL FIELD

The present disclosure relates to a method and apparatus for communication in a cellular Internet of things (IoT).

BACKGROUND ART

To satisfy the growing demands for wireless data traffic since commercialization of a $4^{th}$ generation (4G) communication system, efforts have been made to develop an improved $5^{th}$ generation (5G) or pre-5G communication system. That is why the 5G or pre-5G communication system is called a beyond 4G network communication system or a post long term evolution (post LTE) system.

To achieve high data rates, deployment of the 5G communication system in a millimeter wave (mmWave) band (for example, 60 GHz) is under consideration. In order to mitigate propagation path loss and increase a propagation distance in the mmWave band, beamforming, massive multiple input multiple output (massive MIMO), full dimensional MIMO (FD-MIMO), array antenna, analog beamforming, and large-scale antenna technology have been discussed for the 5G communication system.

Further, to improve a system network, techniques such as evolved small cell, advanced small cell, cloud radio access network (cloud RAN), ultra-dense network, device-to-device (D2D) communication, wireless backhaul, moving network, cooperative communication, coordinated multi-point (CoMP), and interference cancellation have been developed for the 5G communication system.

Besides, advanced coding modulation (ACM) techniques such as hybrid FSK and QAM modulation (FQAM) and sliding window superposition coding (SWSC), and advanced access techniques such as filter bank multi carrier (FBMC) and non-orthogonal multiple access (NOMA), and sparse code multiple access (SCMA) have been developed for the 5G communication system.

Meanwhile, the Internet is evolving from a human-oriented connection network in which human beings generate and consume information to the Internet of things (IoT) in which information is transmitted/received and processed between distributed elements such as things. The Internet of everything (IoE) technology is emerging, which combines the IoT with big data processing through connectivity to a cloud server or the like.

For IoT implementation, technologies such as sensing, wired/wireless communication and network infrastructure, service interfacing, and security are required. Recently, techniques including a sensor network for interconnection between things, machine to machine (M2M) communication, and machine type communication (MTC) have been studied.

An intelligent Internet Technology (IT) service of creating new values for human livings by collecting and analyzing data generated from interconnected things may be provided in an IoT environment. The IoT may find its applications in a wide range of fields including smart home, smart building, smart city, smart car or connected car, smart grid, healthcare, smart appliance, and state-of-the art medical service, through convergence between existing IT technologies and various industries.

In this context, many attempts have been made to apply the 5G communication system to the IoT. For example, techniques such as sensor network, M2M communication, and MTC are implemented by means of beamforming, MIMO, array antennas, and the like for 5G communication. Application of cloud RAN as the afore-described big data processing technique is an example of convergence between 5G technology and IoT technology.

In the cellular Internet of Things (CIoT), CIoT devices may communicate with a base station (BS) and connect to the Internet through a cellular network such as global system for mobile communications (GSM), code division multiple access (CDMA), or long term evolution (LTE). Because the CIoT devices are able to connect to the network wirelessly using wide coverage of the BS, they may maintain the connections to the network without using additional wired or wireless network connection devices.

DISCLOSURE

Technical Problem

Some CIoT devices may be placed in a relatively poor communication environment. For example, a CIoT device attached to a water pipe or a gas pipe to measure the amount of water consumption or gas consumption may be buried under the ground together with the water pipe or the gas pipe. To support CIoT devices in a poor communication environment, coverage needs to be extended, relative to coverage of a legacy cellular system. To provide extended coverage, a very robust transmission scheme (for example, in terms of modulation, coding, and repeated transmission) and more transmission resources may be required. Moreover, CIoT devices may be placed in various communication environments according to places in which they are deployed, and different transmission schemes and different transmission resource requirements may be needed to provide suitable coverage according to the communication environments of the CIoT devices. If a transmission scheme and transmission resources are configured on the assumption that every CIoT device is in the worst communication environment in order to provide sufficient coverage to the CIoT device, the use efficiency of communication resources may be decreased significantly.

Accordingly, an aspect of the present disclosure devised to solve the problem is to provide a method and apparatus for communication of CIoT devices placed in various communication environments.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for communicating with a device, includes transmitting information about a frequency hopping configuration to the device, and receiving an uplink signal frequency-hopped according to the frequency hopping configuration from the device. The frequency hopping configuration is configured to frequency-hop the uplink signal according to a hopping pattern for hopping based on a hopping step and an additional mirroring hopping pattern inserted between hopping patterns.

In another aspect of the present disclosure, a base station (BS) includes a transceiver, and a processor coupled to the transceiver. The processor is configured to transmit information about a frequency hopping configuration to a device, and receive an uplink signal frequency-hopped according to the frequency hopping configuration from the device. The frequency hopping configuration is configured to frequency-hop the uplink signal according to a hopping pattern for hopping based on a hopping step and an additional mirroring hopping pattern inserted between hopping patterns.

In another aspect of the present disclosure, a communication method of a device includes receiving information about a frequency hopping configuration from a BS, and transmitting an uplink signal frequency-hopped according to the frequency hopping configuration to the BS. The frequency hopping configuration is configured to frequency-hop the uplink signal according to a hopping pattern for hopping based on a hopping step and an additional mirroring hopping pattern inserted between hopping patterns.

In another aspect of the present disclosure, a device for wireless communication includes a transceiver, and a processor coupled to the transceiver. The processor is configured to receive information about a frequency hopping configuration from a BS, and transmit an uplink signal frequency-hopped according to the frequency hopping configuration to the BS. The frequency hopping configuration is configured to frequency-hop the uplink signal according to a hopping pattern for hopping based on a hopping step and an additional mirroring hopping pattern inserted between hopping patterns.

In another aspect of the present disclosure, a method for communicating with a device includes detecting collision between resource blocks related to data and resource blocks related to control information, the data and the control information being to be transmitted to the device, and deferring transmission of a part of the resource blocks related to the data, which lasts a time of the collision and afterwards to after transmission of the resource blocks related to the control information.

In another aspect of the present disclosure, a BS includes a transceiver and a processor coupled to the transceiver. The processor is configured to detect collision between resource blocks related to data and resource blocks related to control information, the data and the control information being to be transmitted to a device, and defer transmission of a part of the resource blocks related to the data, which lasts a time of the collision and afterwards, to after transmission of the resource blocks related to the control information.

In another aspect of the present disclosure, a method for communicating with a device includes detecting collision between resource blocks related to data and resource blocks related to control information on uplink of the device, transmitting uplink resource allocation information deferring transmission of a part of the resource blocks related to the data, which lasts a time of the collision and afterwards, to after transmission of the resource blocks related to the control information, and receiving an uplink signal based on the uplink resource allocation information from the device.

In another aspect of the present disclosure, a BS includes a transceiver and a processor coupled to the transceiver. The processor is configured to detect collision between resource blocks related to data and resource blocks related to control information on uplink of a device, transmit uplink resource allocation information deferring transmission of a part of the resource blocks related to the data, which lasts a time of the collision and afterwards, to after transmission of the resource blocks related to the control information, and receive an uplink signal based on the uplink resource allocation information from the device.

Details of other embodiments lie in the detailed description and the attached drawings.

Advantageous Effects

Embodiments of the present disclosure have at least the following effects.

A method and apparatus for communication of CIoT devices placed in various communication environments can be provided.

Further, a method and apparatus for processing collision between resource blocks for uplink or downlink data and resource blocks for uplink or downlink control information can be provided.

A method for performing frequency hopping in a manner that prevents segmentation of a plurality of uplink bonded channels, and an apparatus for performing the method can be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE INVENTION

The advantages and features of the present disclosure, and a method for achieving them will be apparent from the attached drawings and the following detailed description of embodiments. However, the present disclosure may be implemented in various ways, not limited to the following embodiments. The embodiments of the present disclosure are provided to assist in a comprehensive understanding of the scope and spirit of the present disclosure, and the present disclosure is defined only by the appended claims and their equivalents.

The term as used in the present disclosure, first, second, and so on are used to describe various components, not limiting the components. These expressions are used to distinguish one component from another component. Therefore, a first component may be referred to as a second component without departing from the scope of the present disclosure.

Figure 1:
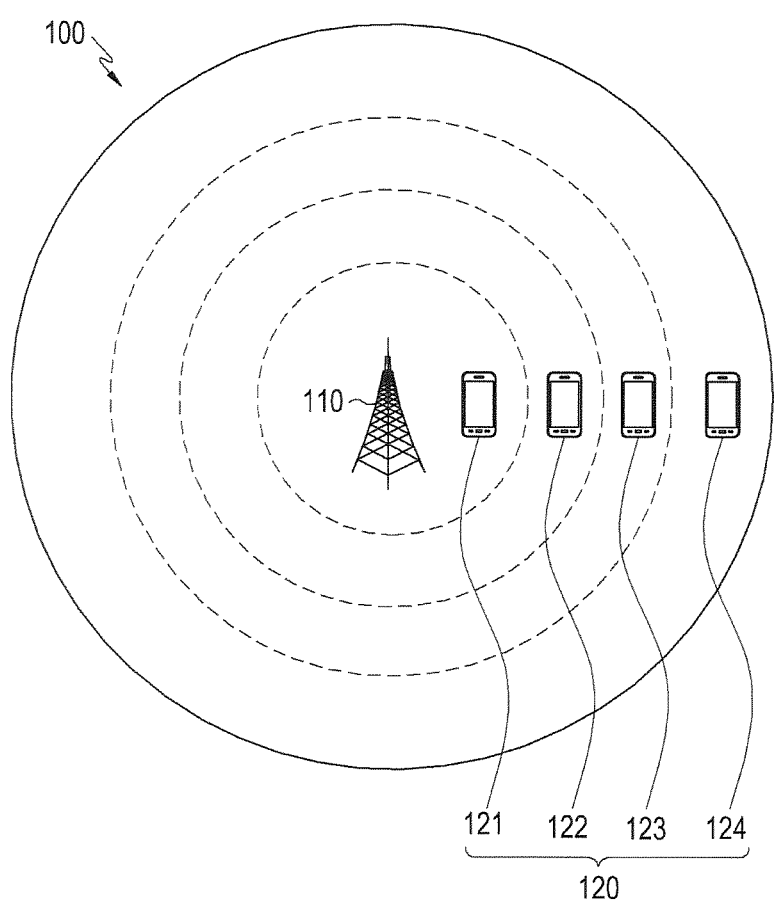
FIG. 1 is a view illustrating a cellular Internet of things (CIoT) environment.

FIG. 1 is a view illustrating a cellular Internet of things (CIoT) environment. Referring to FIG. 1, a CIoT 100 may include a base station (BS) 110 and a plurality of devices 120. While only one BS is shown in FIG. 1 for the convenience of description, the CIoT may include a plurality of BSs which are not shown, and a plurality of devices communicating with each of the BSs.

The plurality of devices 120 may be CIoT devices, and a device mentioned hereinafter in the present disclosure may be a CIoT device. The devices 120 may also be called by other terms for a device that may be served by a BS, known to the technical field, such as user equipment (UE) and mobile station (MS). The plurality of devices 120 may communicate with the BS 110. The plurality of devices 120 may be placed in different communication environments according to their distances to the BS 110 and their deployed locations. For example, a first device 121 may be placed in a better communication environment than a second device 122, and a fourth device 124 may be placed in the poorest communication environment among the plurality of devices 120. The distance between each of the devices 120 and the BS 110 does not mean a physical distance but represents a communication environment in which the device 120 is located, in FIG. 1. That is, while the fourth device 124 is shown as the remotest of the plurality of devices 120 from the BS 110 in FIG. 1, this implies that the fourth device 124 is in the poorest communication environment, rather than the fourth device 124 is physically farthest from the BS 110 among the plurality of devices 120.

A coverage class (CC) may be allocated to each of the devices 120 according to the communication environment of the device 120. For example, a first CC (CC1) may be allocated to the first device 121 in the best communication environment, and second, third, and fourth CCs (CC2, CC3, and CC4) may be allocated to the second, third, fourth devices 122 123, and 124, respectively. The BS 110 may determine a CC for a device based on, but not limited to, a measured reference signal received power (RSRP) and/or reference signal received quality (RSRQ).

Figure 2:
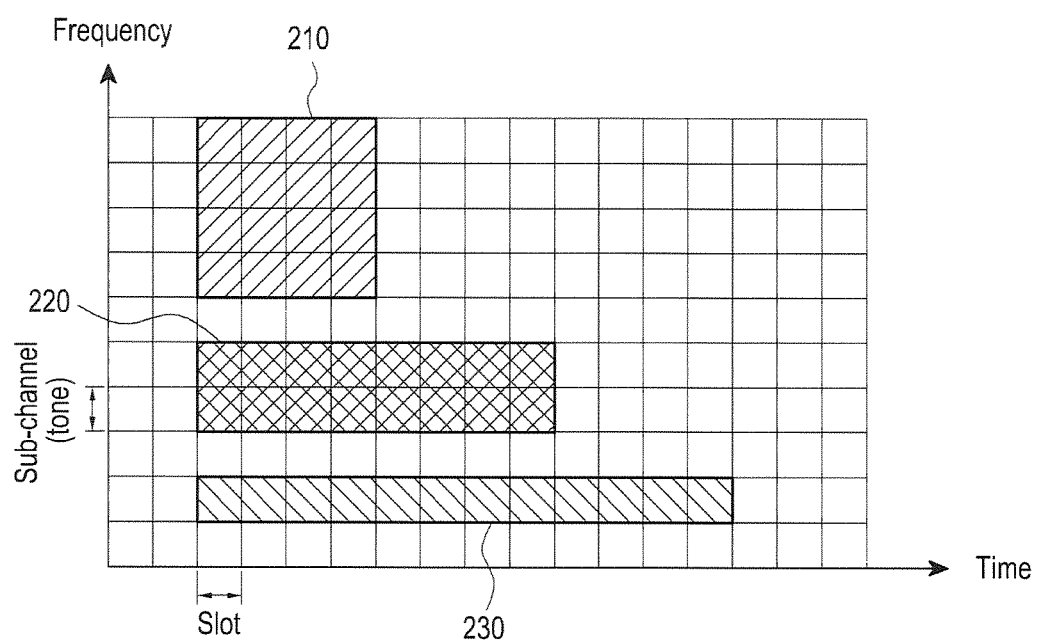
FIG. 2 is an exemplary view illustrating allocation of communication resources to devices in a CIoT.

FIG. 2 is an exemplary view illustrating allocation of communication resources to devices in the CIoT. FIG. 2 illustrates communication resources 210 allocated to the first device 121 having CC1, communication resources 220 allocated to the second device 122 having CC2, and communication resources 230 allocated to the third device 123 having CC3, by way of example. The exemplary communication resources illustrated in FIG. 2 are applicable to both uplink (UL) and downlink (DL).

More communication resources may be allocated to a device located in a relatively poor communication environment in order to ensure coverage for the device. For example, four subchannels (or channels) and four time slots may be allocated to the first device 121 in the best communication environment, for transmission of one data packet. Two subchannels fewer than those of the first device 121 and eight time slots may be allocated to the second device 122 in a poorer communication environment than the first device 121, for transmission of one data packet. One subchannel and more time slots than those of the second device 122 may be allocated to the third device 123 in a poorer communication environment than the second device 122, for transmission of one data packet. To ensure data reception at the third device 123, data may be repeatedly transmitted to the third device 123. In this case, more communication resources may be allocated to the third device 123 than the first and second devices 121 and 122. While not shown, more communication resources may be allocated to the fourth device 124 than the third device 123.

Figure 3:
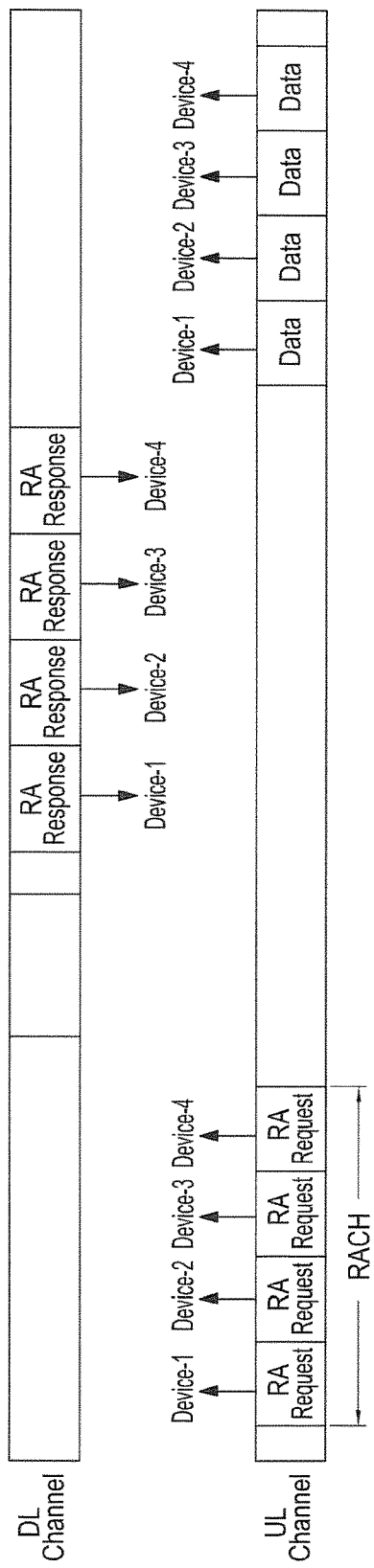
FIG. 3 is a view illustrating a random access procedure in the CIoT.

FIG. 3 is a view illustrating a random access procedure in the CIoT. Devices may report data periodically, and use a random access procedure for each report. Each device may transmit a Random Access (RA) Request on a UL channel, and a BS may transmit an RA Response to the device on a DL channel in response to the RA Request. The RA Response may be transmitted in downlink control information (DCI). Each device may detect an RA Response directed to the device by decoding the DCI, and transmit data in resources determined based on the RA Response.

Figure 4:
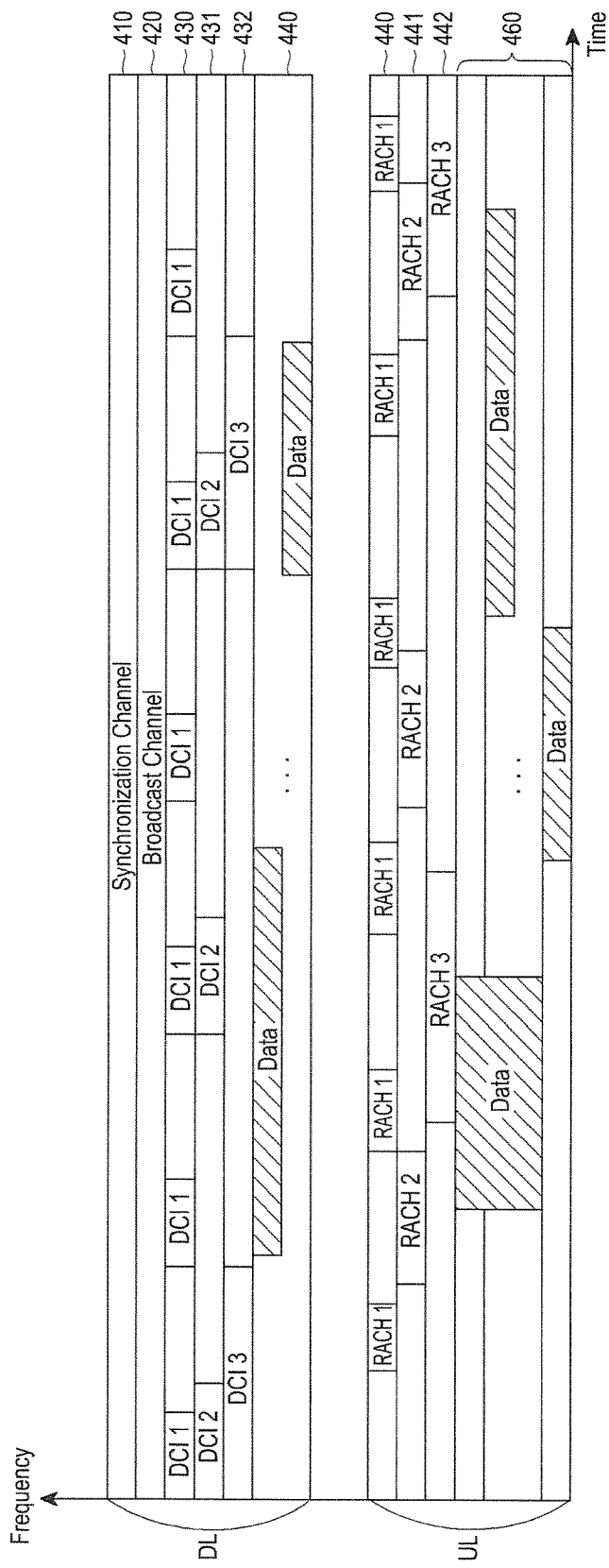
FIG. 4 is a view illustrating a channel structure in the CIoT according to an embodiment of the present disclosure.

FIG. 4 is a view illustrating a channel structure in the MT according to an embodiment of the present disclosure. The channel structure of FIG. 4 may be based on frequency division multiple access (FDMA), and frequency resources may be divided into a plurality of channels or subchannels.

On DL, one channel may be used as a synchronization channel 410 for synchronization between a BS and devices, and another channel may be used as a broadcast channel 420 for broadcasting information to a plurality of devices. The remaining channels may be allocated for transmission of data and DCI.

DCI may be transmitted periodically on a different channel according to a CC. For example, a first DCI (DCI1) for a device to which CC1 has been allocated may be transmitted on a channel 430, a second DCI (DCI2) for a device to which CC2 has been allocated may be transmitted on a channel 431, and a third DCI (DCI3) for a device to which CC3 has been allocated may be transmitted on a channel 432. The length and transmission period of DCI may be different for a different CC. In other words, as the communication environment of a device becomes poorer, DCI for the device may become longer and be transmitted in a longer transmission period, for repeated DCI transmission.

On DL, the remaining channels 440 except for the synchronization channel 410, the broadcast channel 420, and the channels 430, 431, and 432 carrying DCI may be available for transmission of DL data.

On UL, random access channels (RACHs) may be allocated periodically to different channels, for different CCs. An RACH is radio resources allocated for a random access procedure, and may carry an RA Request. A first RACH (RACH1) for the device to which CC1 has been allocated may be transmitted on a channel 440, a second RACH (RACH2) for the device to which CC2 has been allocated may be transmitted on a channel 441, and a third RACH (RACH3) for the device to which CC3 has been allocated may be transmitted on a channel 442. The length and transmission period of an RACH may be different for a different CC. In other words, as the communication environment of a device becomes poorer, an RACH for the device may become longer and be transmitted in a longer transmission period, for repeated transmission of an RA Request.

On UL, remaining channels 460 except the channels 440, 441, and 442 for RACHs may be available for UL data transmission.

Figure 5:
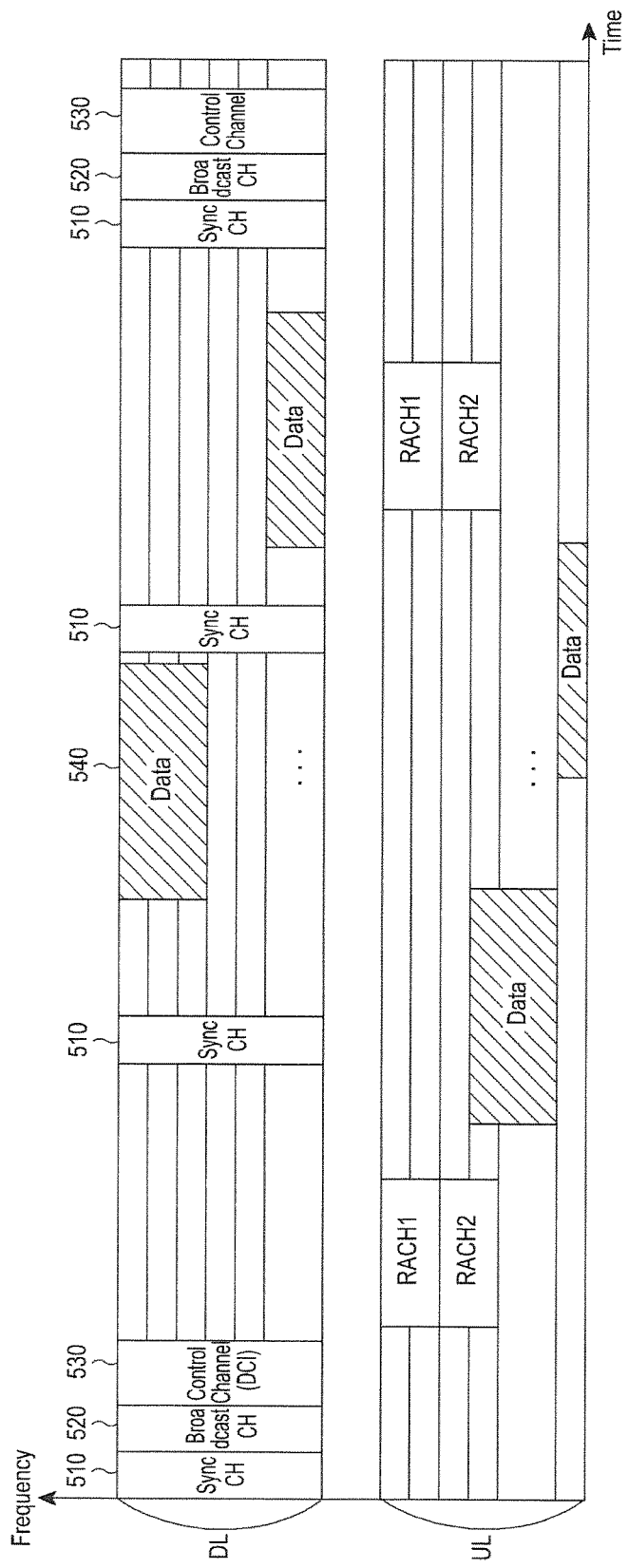
FIG. 5 is a view illustrating a channel structure in the CIoT according to another embodiment of the present disclosure.

Referring to FIG. 5, another embodiment of a channel structure in the CIoT will be described. FIG. 5 is a view illustrating a channel structure in the CIoT according to another embodiment of the present disclosure. The channel structure of FIG. 5 may be based on orthogonal frequency division multiple access (OFDMA) or single carrier-frequency division multiple access (SC-FDMA).

In FIG. 5, a synchronization channel 510 for transmitting a synchronization signal, a broadcast channel 520 for transmitting a broadcast signal, and a control channel 530 for transmitting DCI may occupy the total bandwidth of DL and may be allocated periodically. While not shown, different amounts of communication resources in the control channel 530 may be allocated to DCI according to the CCs of devices. That is, more communication resources may be allocated to DCI directed to a device located in a poorer communication environment. The remaining resources except for the resources to which the synchronization channel 510, the broadcast channel 520, and the control channel 530 are allocated may be available for transmission of data 540.

On UL, resources may be allocated periodically to an RACH. Resources for RACH1 and resources for RACH2 may be allocated in such a manner that the resources may have the same periodicity and the same length. However, compared to the resources for RACH1, the resources for RACH2 may also be allocated to a channel (that is, frequency resources) available for data. As a consequence, more frequency resources may be allocated to RACH2 than RACH1. In this manner, more communication resources may be allocated to an RACH for a device in a poorer communication environment.

For efficient communication with devices having different CCs, different modulation and coding schemes (MCSs) may be applied to the CCs. For a device in a good communication environment, an MCS that increases transmission efficiency and decreases a repetition number may be used. On the contrary, an MCS that decreases transmission efficiency and increases a repetition number may be applied to a device in a poor communication environment. [Table 1] below illustrates an exemplary MCS configuration method in a CIoT system.

TABLE 1

| MCS Index | Modulation | Code Rate | # Channels | # Repetition | Coverage Class |
|---|---|---|---|---|---|
| 0 | BPSK | 1/3 | 1 | 16 | Worst CC |
| 1 | BPSK | 1/3 | 1 | 8 | |
| ... | | | | | |
| n | QPSK | 2/3 | 2 | 1 | |
| ... | | | | | |
| N | 8 PSK | 2/3 | 8 | 1 | Best CC |

In addition, it is necessary to configure various coding block sizes (CBSs) for each MCS so as to support different payload sizes for one packet. Therefore, resource blocks (RBs) of different sizes having different amounts of resources may be allocated by combining MCSs with CBSs, to support different applications. [Table 2] illustrates an exemplary MCS-CBS table in the CIoT system.

TABLE 2

| MCS Index = 0 | CBS Index | 0 | 1 | 2 | 3 | ... |
|---|---|---|---|---|---|---|
| | # payload bits | 40 | 80 | 120 | 160 | |
| | Duration(e.g., # slots, or ms) | 40 | 80 | 120 | 160 | |
| ... | | | | | | |
| MCS Index = N | CBS Index | 0 | 1 | 2 | 3 | ... |
| | # payload bits | 480 | 960 | 1440 | 1920 | |
| | Duration(e.g., # slots, or ms) | 10 | 20 | 30 | 40 | |

A BS may allocate resources of an appropriate size to a device by combining an MCS with a CBS based on the amount of data transmitted or received by the device. Resource assignments may be transmitted to devices by DCI. The DCI may include RACH configurations of CCs corresponding to the devices as well as scheduled resource allocation information for UL and DL transmissions of the devices. [Table 3] illustrates exemplary packet payload elements of DCI

TABLE 3

| Field | Description |
|---|---|
| # DL Allocation | The number of scheduled downlink allocations |
| List of DL Allocations [ ] | Field for each DL allocation: RNTI (MS ID) Channel Index—Start Indication MCS Index CBS Index (or duration) Reserved (e.g., for ACK information etc.) |
| # UL Allocation | The number of scheduled uplink allocations |
| List of UL Allocations [ ] | Field for each UL allocation: RNTI (MS ID) Channel Index Start Indication |

TABLE 3-continued

| Field | Description |
| --- | --- |
| | MCS Index |
| | CBS Index (or duration) |
| | Reserved (e.g., for ACK information etc.) |
| # RACH Configurations | The number of RACH configurations |
| List of RACH Configurations [ ] | Field for each RACH configuration: Channel Index Start Indication MCS CBS (or duration, or number of RACH allocation unit Reserved |
| Others | Other necessary fields |
| Padding | Padding field to make the payload size to be a number of octets |

In [Table 3], only fields related to resource allocations are listed, and the DCI may further include various fields other than the exemplary fields.

Figure 6:
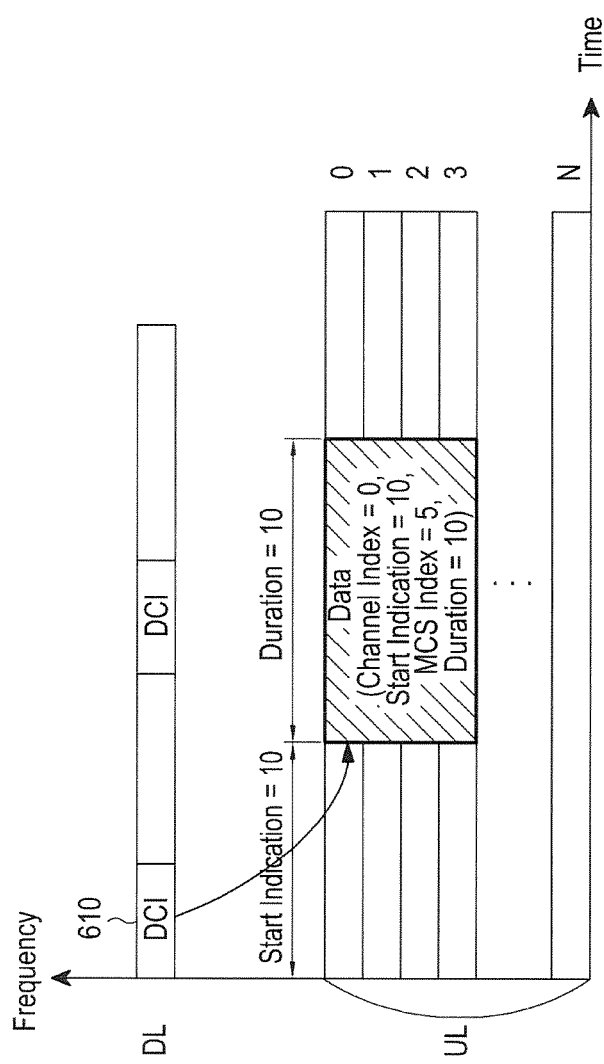
FIG. 6 is a view illustrating an uplink transmission based on downlink control information (DCI) according to an embodiment of the present disclosure.

Now, a detailed description will be given of a UL resource allocation method with reference to FIG. 6. FIG. 6 is a view illustrating a UL transmission based on DCI according to an embodiment of the present disclosure. For a UL transmission, DCI 610 includes a Channel Index indicating a starting transmission channel, set to 0, a Start Indication indicating a UL transmission time based on a transmission time of the DCI 610, set to 10, an MCS Index indicating an MCS, set to 5, and a Duration indicating a UL transmission duration, set to 10. UL data is transmitted based on information included in the DCI 610.

With reference to FIGS. 7 to 11, methods for processing collision between resources for data and resources for control information will be described below.

Figure 7:
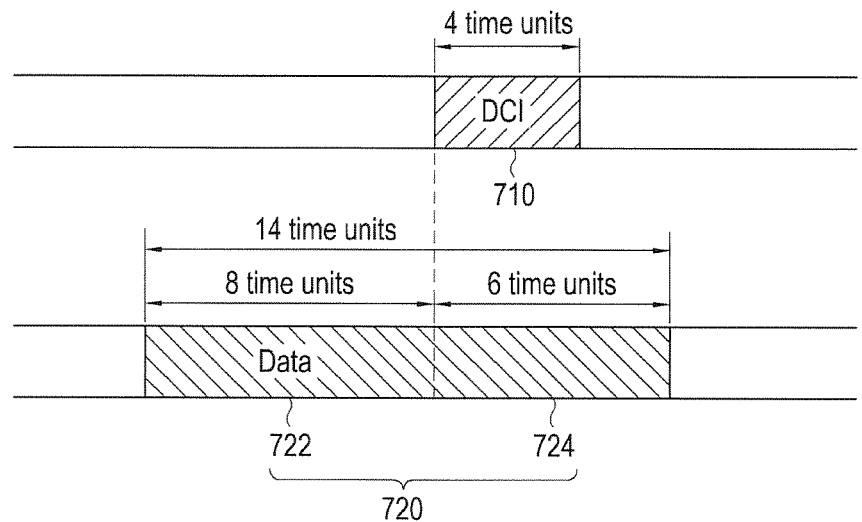
FIG. 7 is an exemplary view illustrating collision between resource blocks for DCI and resource blocks for data on downlink.

FIG. 7 is an exemplary view illustrating collision between RBs for DCI and RBs for data on DL. Referring to FIG. 7, at least a part of data RBs 720 may be allocated overlapped with DCI RBs 710. In this case, collision may occur in resource allocation. The data RBs 720 may include a first part 722 preceding collision with the DCI RBs 710 and a second part 724 lasting from the moment of the collision with the DCI RBs 710 and afterwards. While only the DCI RBs 710 are shown as colliding with the data RBs 720 in FIG. 2, RBs for transmitting a synchronization signal including a primary synchronization signal (PSS) and a secondary synchronization signal (SSS) may also collide with the data RBs 720. A synchronization signal, a broadcast signal, and DCI may generically be referred to as control information, and a method for processing collision between DCI RBs and data RBs, as described later may be applied to process collision between RBs for any control information and data RBs. Further, the data RBs 720 may be RBs for data transmitted on a physical downlink shared channel (PDSCH) or a physical downlink control channel (PDCCH).

Besides, according to some embodiments, collision may also occur between the data RBs 720 and a transmission gap between DL subframes. The following method for processing collision may also be applied to this case.

Figure 8:
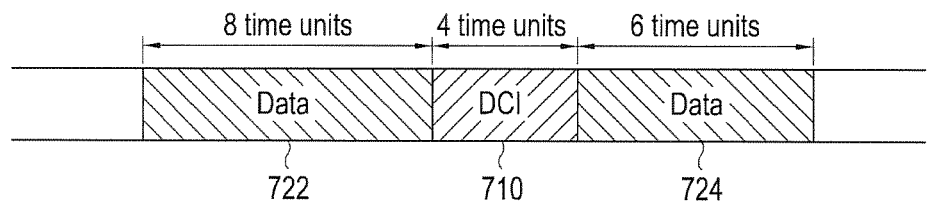
FIG. 8 is a view illustrating a method for processing collision between resource blocks for DCI and resource blocks for data on downlink according to an embodiment of the present disclosure.

FIG. 8 is a view illustrating a method for processing collision between DCI RBs and data RBs on DL according to an embodiment of the present disclosure. Referring to FIG. 8, the DCI RBs 710 may be transmitted at an initially allocated position. The first part 722 of the data RBs 720 may be transmitted at the initially allocated position, and the transmission time of the second part 724 of the data RBs 722 may be deferred to after the transmission point of the DCI RBs 710. The transmission of the second part 724 may be successive to the transmission of the DCI RBs 710. According to the resource allocation processing method illustrated in FIG. 7, the BS may transmit relatively important DCI at a predetermined time in predetermined resources to devices without data loss. The deferral of the transmission of the second part 724 in the data RBs 722 may be indicated to the devices in DCI by the BS. If collision occurs between the data RBs 720 and a DL transmission gap, transmission of a part of the data RBs, which lasts from the moment of the collision and afterwards may be deferred to a next valid DL subframe.

While not shown, according to some embodiments, when collision occurs between the data RBs 720 and the DCI RBs 710, transmission of the whole data RBs 720 may be deferred to after transmission of the DCI RBs 710.

Figure 9:
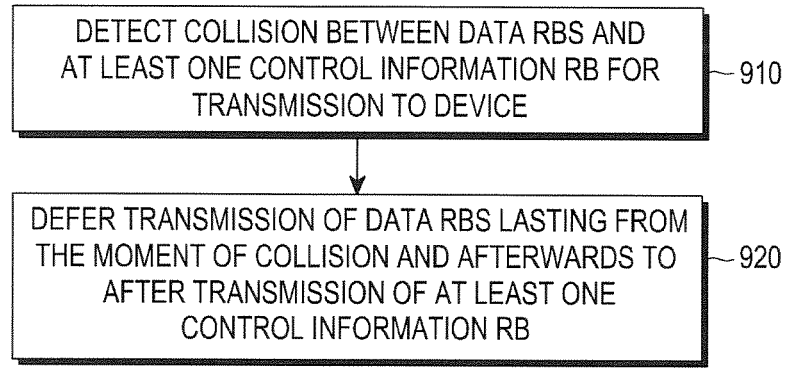
FIG. 9 is a flowchart illustrating a method for processing collision between resource blocks for DCI and resource blocks for data on downlink according to an embodiment of the present disclosure.

FIG. 9 is a flowchart illustrating a method for processing collision between DCI RBs and data RBs on DL according to an embodiment of the present disclosure. In operation 910, the BS may detect collision between data RBs and at least one RB related to control information, the RBs being directed to a device. The BS may defer transmission of data RBs lasting from the moment of collision and afterwards to after transmission of the at least one control information RB in operation 920.

Figure 10:
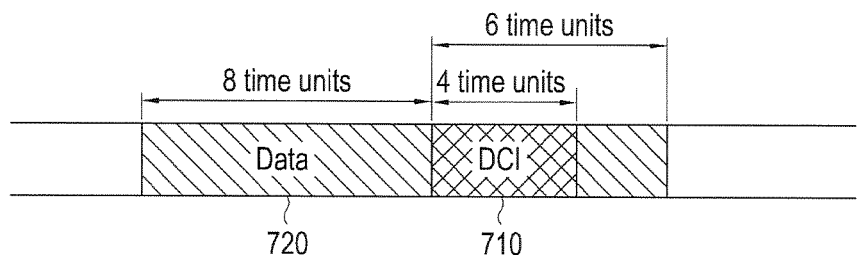
FIG. 10 is a view illustrating a method for processing collision between resource blocks for DCI and resource blocks for data on downlink according to another embodiment of the present disclosure.

FIG. 10 is a view illustrating a method for processing collision between DCI RBs and data RBs on DL according to another embodiment of the present disclosure. The BS may ignore collision between the DCI RBs 710 and the data RBs 720. The collided RBs may carry both DCI and data supposed to be transmitted in the RBs, and act as noise to each other.

Figure 11:
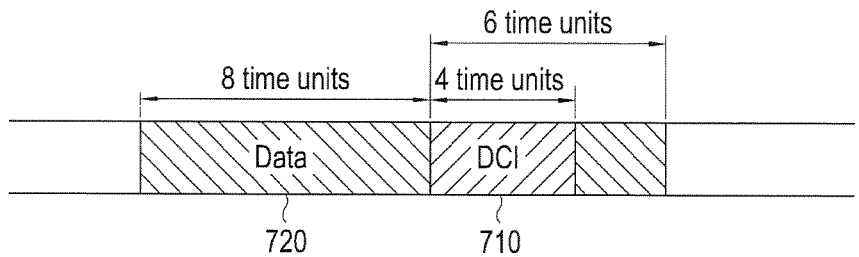
FIG. 11 is a view illustrating a method for processing collision between resource blocks for DCI and resource blocks for data on downlink according to another embodiment of the present disclosure.

FIG. 11 is a view illustrating a method for processing collision between DCI RBs and data RBs on DL according to another embodiment of the present disclosure. The BS may discard or puncture a part of the data RBs 720, which collide with the DCI RBs 710. In this case, although a part of data is lost, the device may receive the data successfully through repeated transmission or retransmission of the data.

When DCI RBs collide with data RBs, the BS may select one of the collision processing methods illustrated in FIGS. 8, 10, and 11. According to some embodiments, the BS may select a collision processing method according to the size of a collided area. For example, if the size of collided RBs is equal to or larger than a threshold, the BS may select the method of FIG. 8 that may ensure successful transmission of data to mitigate the constraint of additional data transmission. If the size of the collided RBs is less than the threshold, the BS may select the method of FIG. 10 or FIG. 11. Accordingly, the BS may compare the size of the collided RBs with the threshold before performing one of the methods illustrated in FIGS. 8, 10, and 11.

Figure 12:
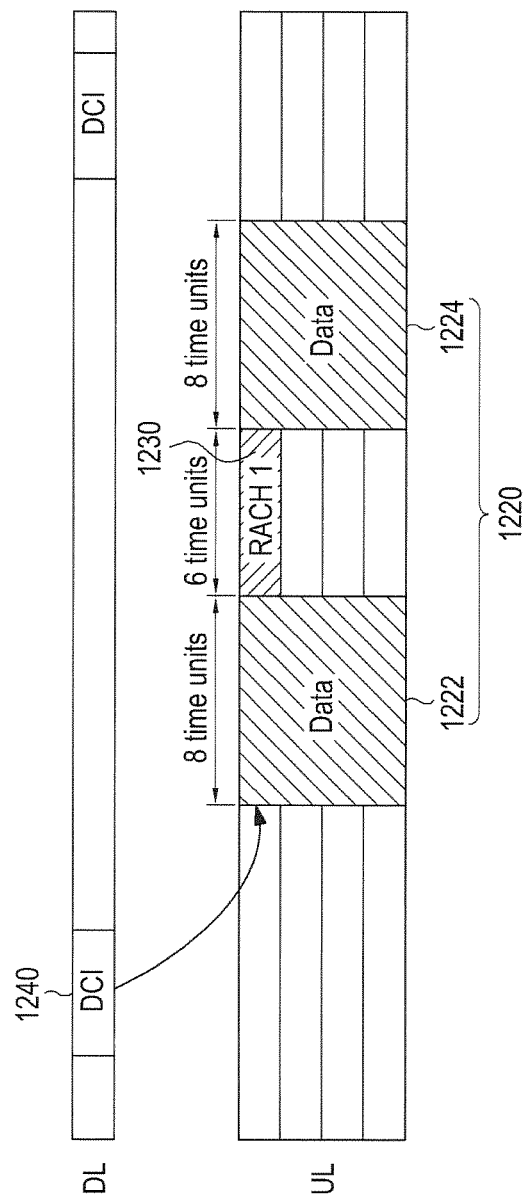
FIG. 12 is a view illustrating a method for processing collision between resource blocks for a random access channel (RACH) and resource blocks for data on uplink according to an embodiment of the present disclosure.

FIG. 12 is a view illustrating a method for processing collision between RACH RBs and data RBs on UL according to an embodiment of the present disclosure. As with DL, RACH RBs 1230 and RBs that may carry other control information may also be referred to as control information RBs. Similarly to the case of FIG. 8, a first part 1222 of data RBs 1220, which precedes the moment of collision with the RACH RBs 1230, may be transmitted in initially allocated resources, and a second part 1224 of the data RBs 1220, which lasts from the moment of the collision with the RACH RBs 1230 and afterwards may be deferred to after the end of transmission of the RACH RBs 1230. A plurality of channels may be allocated for data transmission, and even though only a part of the channels collides with the RACH RBs 1230, data transmission on the whole allocated channels may be deferred. Collision between resource allocations for UL transmissions may be detected by the BS. The BS may transmit DCI 1240 including UL resource allocation information indicating collision processing as illustrated in FIG. 12 to a device. Upon receipt of the DCI 1240 including the UL resource allocation information, the device may generate a UL signal that defers the second part 1224 of the data RBs 1220, lasting from the moment of the collision with the RACH RBs 1230 and afterwards to after the transmission of the RACH RBs 1230, and transmit the generated UL signal to the BS.

According to some embodiments, if the data RBs 1220 collide with the RACH RBs 1230, the transmission of the whole data RBs 1220 may be deferred to after the transmission of the DCI RBs 1230.

While not shown, according to some embodiments, if data RBs collide with control information RBs on UL, data and control information may be transmitted, while the collision is ignored, as is with the case of FIG. 10. In other embodiments, data of the collided RBs may be discarded or punctured, similarly to in the case of FIG. 11. If the data of the collided RBs are discarded or punctured, all RBs at the moment of collision may also be discarded or punctured, for channels to which the collision has not occurred among a plurality of channels for data transmission, which is similar to FIG. 12. One of the foregoing UL collision processing methods may be selected by comparing the number of collided RBs with a threshold, similarly to DL.

With reference to FIGS. 13A, 13B, 14, and 15, frequency hopping of the present disclosure will be described.

Frequency hopping may be used to achieve interference randomization between different cells or sectors and frequency diversity. Frequency hopping may be performed across a set of channels allocated to a cell or sector. A frequency hopping pattern may be predetermined and applied commonly to all devices operating in the same cell or sector. Frequency hopping information may be broadcast, for example, in a system information block (SIB) by a BS. Devices may perform frequency hopping according to the received frequency hopping information, and determine specific resources in which the frequency hopping is performed based on the received frequency hopping information.

Figures 13A, 13B:
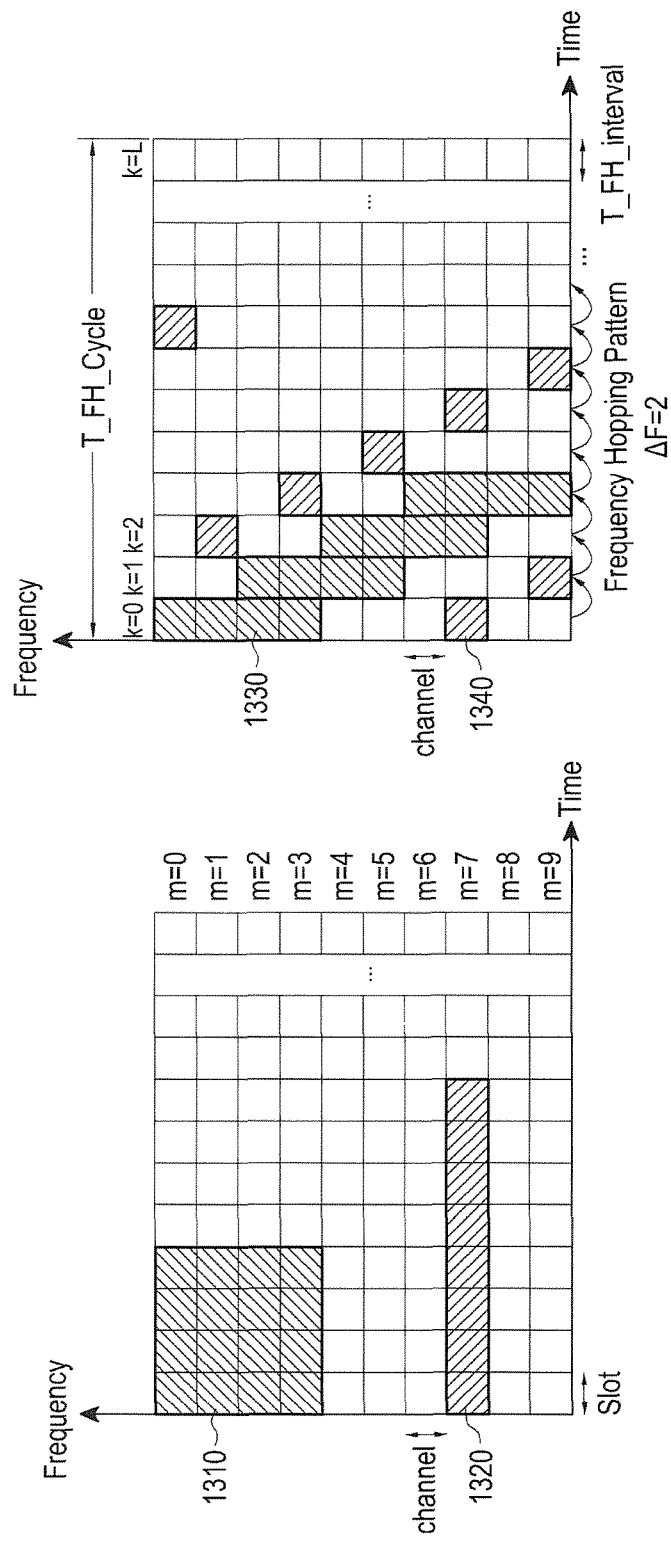
FIGS. 13A and 13B are views illustrating frequency hopping on uplink according to an embodiment of the present disclosure.

FIGS. 13A and 13B are views illustrating frequency hopping on UL according to an embodiment of the present disclosure. FIG. 13A illustrates resource allocation 1310 to a first device and resource allocation 1320 to a second device before frequency hopping is applied. Four channels and four time slots may be allocated to the first device. The channels with channel index m set to 0 to 3 allocated to the first device may be bonded. The bonded channels may be called a set of channels. One channel and eight time slots may be allocated to the second device.

FIG. 13B illustrates resource allocation 1330 to the first device and resource allocation 1340 to the second device after frequency hopping is applied. Frequency allocation may be performed according to the following equation (1)

$$m_k=(I_{ch}+k\times\Delta_F)\bmod M \quad\quad\text{equation (1)}$$

In equation (1), k is the index of a time slot defined by a frequency hopping interval, T_FH_interval, $m_k$ is the index of a channel in time slot k, $I_{ch}$ is the index of a channel for k=0, $\Delta_F$ is a hopping step represented as a channel index (that is, 2 in FIG. 13B), and M is the total number of channels over which frequency hopping is performed (that is, 10 in FIG. 13B).

Figure 14:
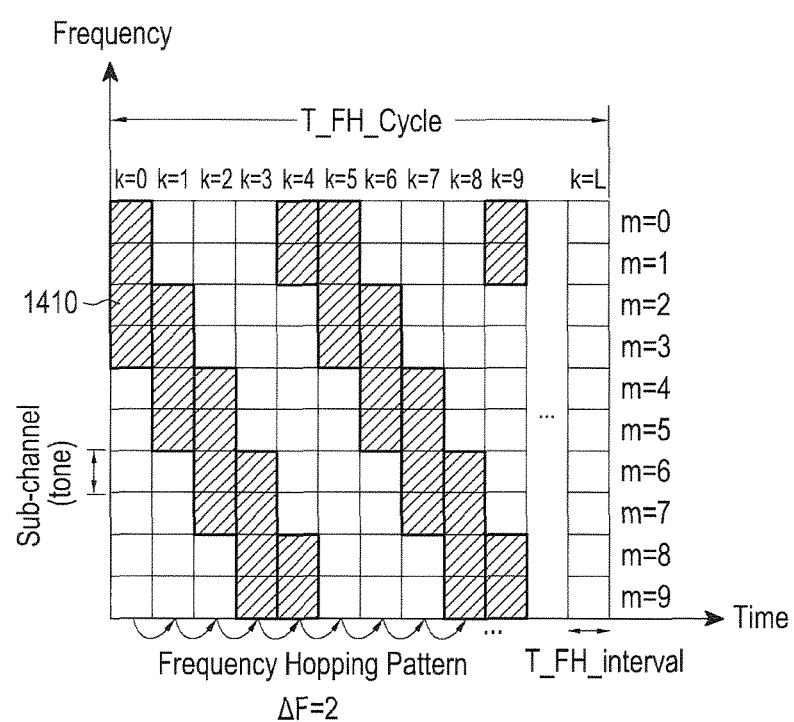
FIG. 14 is a view illustrating segmentation of bonded channels due to frequency hopping on uplink.

If frequency hopping takes place according to one pattern or rule as described in equation (1), there is no problem with allocation of only one channel as is the case with the second device in FIG. 13A. However, if a plurality of bonded channels are allocated to a device such as the first device, the set of the bonded channels may be segmented. With reference to FIG. 14, segmentation of bonded channels will be described below.

FIG. 14 is a view illustrating segmentation of bonded channels due to frequency hopping on UL. In FIG. 14, it is assumed that more time slots are allocated to the first device than in FIGS. 13A and 13B. Resource allocation 1410 to the first device after frequency hopping by equation (1) is illustrated. In this case, the set of bonded channels is segmented in time slot 3 (k=3) and time slot 9 (k=9). The segmentation of the set of bonded channels may destroy the single carrier property of UL transmission. This does not matter if the device is capable of transmitting separated channels. Otherwise, the device may not perform UL transmission normally. Accordingly, a frequency hopping method for ensuring the single carrier property to enable a device with low transmission capability to perform a normal operation is required.

Figure 15:
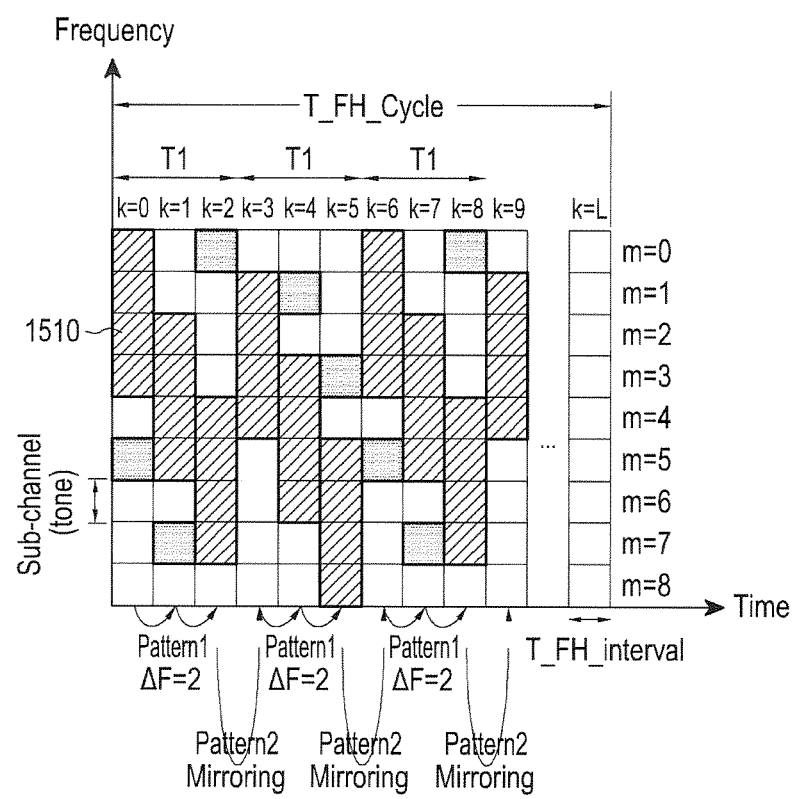
FIG. 15 is a view illustrating frequency hopping on uplink according to another embodiment of the present disclosure.

FIG. 15 is a view illustrating frequency hopping on UL according to another embodiment of the present disclosure. In FIG. 15, it is assumed that more time slots are allocated to the first and second devices than in FIG. 13A. FIG. 15 illustrates frequency-hopped resource allocation 1510 to the first device and frequency-hopped resource allocation 1520 to the second device in this case. In FIG. 15, frequency hopping may be performed based on two frequency hopping schemes. Frequency hopping may be performed across time slot 0 to time slot 2 (k=0 to 2), time slot 3 to time slot 5 (k=3 to 5), and across time slot 6 to time slot 8 (k=6 to 8), according to a first frequency hopping scheme or pattern as described in equation (1). The first frequency hopping pattern may be a basic frequency hopping pattern. Frequency hopping may be performed between time slot 2 and time slot 3 (k=2 and k=3), between time slot 5 and time slot 6 (k=5 and k=6), and between time slot 8 and time slot 9 (k=8 and k=9), according to a second frequency hopping scheme or pattern different from the first frequency hopping scheme or pattern. That is, according to another embodiment of the present disclosure, segmentation of a plurality of bonded channels may be prevented by inserting the second frequency hopping scheme between the first frequency hopping schemes. The second frequency hopping scheme or pattern may be referred to as an additional mirroring scheme or pattern. The frequency hopping method illustrated in FIG. 15 may be defined by the following equation (2), equation (3), and equation (4).

$$m_k=I_{ch}, \text{ if } k=0 \quad\quad\text{equation (2)}$$

$$m_k=(m_{k-1}+\Delta_F)\bmod M, \text{ if } 0<k\leq L-1, \bmod(k,j)\neq 0 \quad\quad\text{equation (3)}$$

$$m_k=(M-m_{k-1}-B)\bmod M, \text{ if } 0<k\leq L-1, \bmod(k,j)=0 \quad\quad\text{equation (4)}$$

Herein, j is a mirroring interval, that is, a time slot interval to which the mirroring pattern, that is, the second frequency hopping scheme is applied (3 in the embodiment of FIG. 15), B is the number of bonded channels (4 in the embodiment of FIG. 15), and L is the number of hopping intervals during a total period of frequency hopping.

Figure 16:
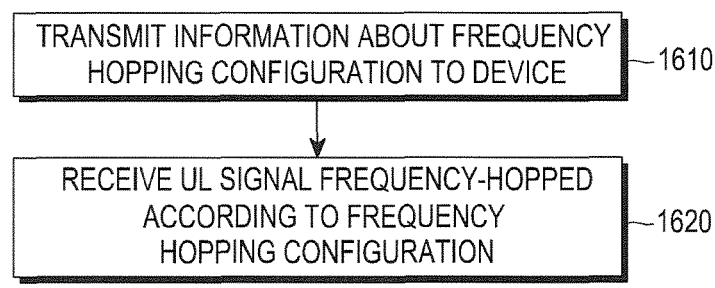
FIG. 16 is a flowchart illustrating a method for performing frequency hopping on uplink by a base station (BS) according to another embodiment of the present disclosure.

FIG. 16 is a flowchart illustrating a method for performing frequency hopping on UL by a BS according to another embodiment of the present disclosure. In operation 1610, the BS may transmit information about a frequency hopping configuration to a device. The BS may broadcast the information about the frequency hopping configuration, for example, in an SIB. The frequency hopping configuration may be configured so as to prevent segmentation of a plurality of bonded channels in UL transmission of the device. The frequency hopping configuration may include, for example, information about the frequency hopping schemes described with reference to FIG. 15. For example, the device may transmit a UL signal which is frequency-hopped based on the received frequency hopping configuration information. The BS may receive the frequency-hopped UL signal according to the frequency hopping configuration in operation 1620.

Figure 17:
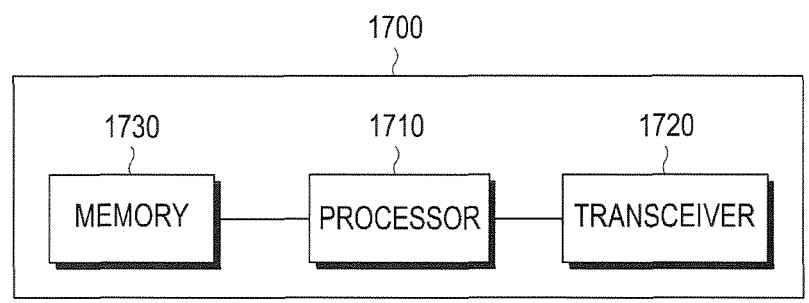
FIG. 17 is a block diagram of a BS or a device according to an embodiment of the present disclosure.

FIG. 17 is a block diagram of a BS or a device according to an embodiment of the present disclosure. A BS 1700 may include a processor 1710, a transceiver 1720, and a memory 1730. The processor 1710 may provide overall control to the BS 1700. The afore-described operations of the BS 1700 may be understood as performed by the processor 1710. While the transceiver 1720 and the memory 1730 are also configured to perform unique functions, the processor 1710 controls execution of the functions and thus operations performed directly by the transceiver 1720 and the memory 1730 may also be interpreted as performed substantially by the processor 1710. The transceiver 1720 may be coupled to the processor 1710 and transmit and receive data to and from the device and other devices. The memory 1730 may store temporary or non-temporary data required for execution of functions in the processor 1710, or store commands or codes required to operate the processor 1710. While the BS has been described with reference to FIG. 17, the description of the BS is applied to the device substantially in the same manner.

Those skilled in the art will additionally understand that various exemplary logic blocks, modules, circuits, methods, and algorithms described in relation to the disclosed examples can be implemented in electronic hardware, computer software, or a combination of both. To clarify the interchangeability between hardware and software, various illustrative components, blocks, modules, circuits, and methods have been described above generally in terms of their functionality. Whether such functionality is implemented in hardware or software depends upon particular application and design constraints imposed on the overall system. The described functionality can be implemented in varying ways for each particular application, but such implementation decisions should not be interpreted as departure from the scope of the disclosure.

The various illustrative logical blocks, modules, and circuits described in connection with the embodiments disclosed herein can be implemented or performed by a general purpose processor, a digital signal processor (DSP), an application specific integrated circuit (ASIC), a field programmable gate array (FPGA) or other programmable logic device, a discrete gate or transistor logic, discrete hardware components, or any combination thereof designed to perform the functions described herein. A general purpose processor may be a microprocessor. Alternatively, the processor may be a processor, a controller, a microcontroller, or a state machine. The processor may also be implemented as a combination of computing devices, for example, a combination of a DSP and a microprocessor, a plurality of microprocessors, one or more microprocessors in conjunction with a DSP core, or any other such configuration.

The methods or algorithms described in connection with the embodiments disclosed herein can be embodied directly in hardware, in a software module executed by a processor, or in a combination of both. A software module may reside in a random access memory (RAM), a flash memory, a read only memory (ROM), an erasable programmable ROM (EPROM), an electrically erasable programmable ROM (EEPROM), registers, a hard disk, a removable disk, a compact disk-read only memory (CD-ROM), or any other form of storage medium known in the art. The storage medium may be coupled to the processor such that the processor may read information from, and write information to, the storage medium. Alternatively, the storage medium may be incorporated into the processor. The processor and the storage medium may reside in an ASIC.

In one or more exemplary embodiments, the described functions may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a general purpose computer or a special purpose computer. Also, any connection means is properly termed a computer-readable medium. For example, if software is transmitted from a Web site, a server, or any other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media.

Although the embodiments of the present disclosure have been described with reference to the attached drawings, those skilled in the art will appreciate that the present invention may be carried out in other specific ways than those set forth herein without departing from the spirit and essential characteristics of the present disclosure. The above embodiments are therefore to be construed in all aspects as illustrative and not restrictive.

The invention claimed is:

1. A method for communicating with a device, the method comprising:
   transmitting information about a frequency hopping configuration to the device; and
   receiving an uplink signal frequency-hopped according to the frequency hopping configuration from the device,
   wherein the frequency hopping configuration is configured to frequency-hop the uplink signal according to a hopping pattern for hopping based on a hopping step and an additional mirroring hopping pattern,
   wherein the additional mirroring hopping pattern is inserted between hopping patterns if a set of bonded channels is segmented without the additional mirroring hopping pattern.

2. The method according to claim 1, wherein the frequency hopping is performed according to the following equations, $mk = Ich$, if $k=0$ $mk = (mk-1+\Delta F) \bmod M$, if $0 < k \leq L-1$, $\bmod(k,j) \neq 0$ $mk = (M-mk-1-B) \bmod M$, if $0 < k \leq L-1$, $\bmod(k,j) = 0$ where k is an index of a time slot defined by a frequency hopping interval, L is a number of hopping intervals in a frequency hopping period, mk is an index of a channel in time slot k, Ich is an index of a channel for time slot 0 (k=0), M is a total number of channels across which the frequency hopping is performed, B is a number of a plurality of bonded channels, j is a number of hopping intervals between additional mirroring hopping patterns, and ΔF is a frequency hopping step.

3. The method according to claim 1, wherein the information about the frequency hopping configuration is broadcast.

4. A base station (BS) comprising:
a transceiver; and
a processor coupled to the transceiver,
wherein the processor is configured to transmit information about a frequency hopping configuration to a device, and receive an uplink signal frequency-hopped according to the frequency hopping configuration from the device, and
wherein the frequency hopping configuration is configured to frequency-hop the uplink signal according to a hopping pattern for hopping based on a hopping step and an additional mirroring hopping pattern,
wherein the additional mirroring hopping pattern is inserted between hopping patterns if a set of bonded channels is segmented without the additional mirroring hopping pattern.

5. A communication method of a device, comprising:
receiving information about a frequency hopping configuration from a base station (BS); and
transmitting an uplink signal frequency-hopped according to the frequency hopping configuration to the BS,
wherein the frequency hopping configuration is configured to frequency-hop the uplink signal according to a hopping pattern for hopping based on a hopping step and an additional mirroring hopping pattern,
wherein the additional mirroring hopping pattern is inserted between hopping patterns if a set of bonded channels is segmented without the additional mirroring hopping pattern.

6. A device for wireless communication, the device comprising:
a transceiver; and
a processor coupled to the transceiver,
wherein the processor is configured to receive information about a frequency hopping configuration from a base station (BS), and transmit an uplink signal frequency-hopped according to the frequency hopping configuration to the BS, and
wherein the frequency hopping configuration is configured to frequency-hop the uplink signal according to a hopping pattern for hopping based on a hopping step and an additional mirroring hopping pattern,
wherein the additional mirroring hopping pattern is inserted between hopping patterns if a set of bonded channels is segmented without the additional mirroring hopping pattern.

* * * * *